US008364787B2

(12) United States Patent
Chou

(10) Patent No.: US 8,364,787 B2
(45) Date of Patent: Jan. 29, 2013

(54) AUTOMATICALLY ADJUSTING COMMAND PARAMETERS TO SUPPORT DEVICES OF A COMPUTER NETWORK

(75) Inventor: Tim Chou, Syosset, NY (US)

(73) Assignee: CA, Inc., Islandia, NY (US)

( * ) Notice: Subject to any disclaimer, the term of this patent is extended or adjusted under 35 U.S.C. 154(b) by 594 days.

(21) Appl. No.: 11/833,295

(22) Filed: Aug. 3, 2007

(65) Prior Publication Data
US 2009/0037561 A1 Feb. 5, 2009

(51) Int. Cl.
*G06F 15/177* (2006.01)
*G06F 3/041* (2006.01)
*H04M 3/42* (2006.01)
*H04M 3/00* (2006.01)

(52) U.S. Cl. ..... 709/220; 709/229; 345/173; 455/414.1; 455/418

(58) Field of Classification Search ........... 709/217–229
See application file for complete search history.

(56) References Cited

U.S. PATENT DOCUMENTS

| 5,819,294 | A  | * | 10/1998 | Chambers | 340/12.24 |
| 2001/0017615 | A1 | * | 8/2001 | Lin et al. | 345/173 |
| 2005/0050214 | A1 | * | 3/2005 | Nishiyama et al. | 709/229 |
| 2008/0311889 | A1 | * | 12/2008 | Dunko et al. | 455/414.1 |

OTHER PUBLICATIONS

"Best Practices for Using BrightStor ARCserve Backup r11.1 and Microsoft Windows 2003 Server VSS Hardware Snapshot," Computer Associates International, Inc., 57 pages, 2004.
Menges, Steven A., et al., "24x7 Operations: Snapshot Backup/Recovery Strategy, Benefits and Implementation Best Practices," White Paper, Computer Associates International, Inc., 7 pages, Oct. 2004.

* cited by examiner

*Primary Examiner* — Ashok Patel
*Assistant Examiner* — Evans Desrosiers
(74) *Attorney, Agent, or Firm* — Baker Botts L.L.P.

(57) ABSTRACT

Adjusting one or more command parameters for a device of a computer network includes accessing command sets. A command set comprises one or more commands supported by a known device, and a command has one or more command parameters. One or more command sets associated with an unknown device are identified. The following are repeated for each command set of the one or more command sets until a termination event occurs: applying the command set to the unknown device to perform an operation; determining whether the command set has failed to perform the operation; and automatically adjusting the command parameters of the command set if the command set has failed to perform the operation.

20 Claims, 1 Drawing Sheet

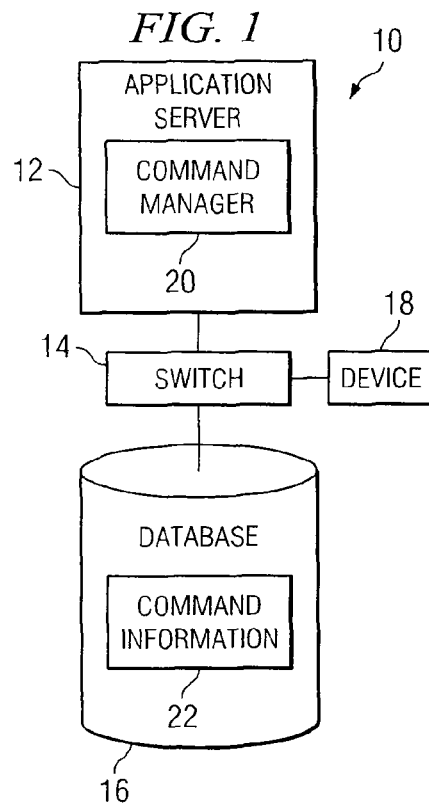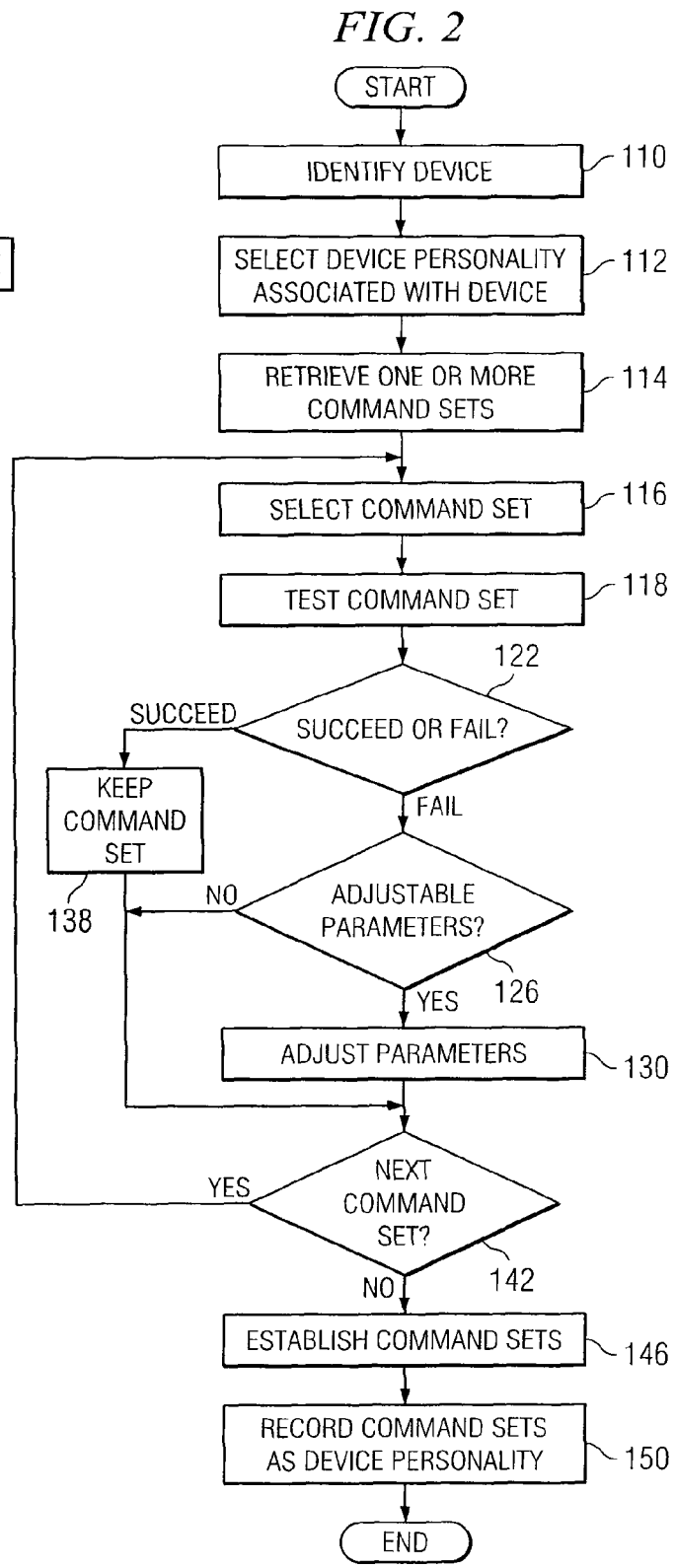

AUTOMATICALLY ADJUSTING COMMAND PARAMETERS TO SUPPORT DEVICES OF A COMPUTER NETWORK

TECHNICAL FIELD

This invention relates generally to the field of computer networks and, more specifically, to automatically adjusting command parameters to support devices of a computer network.

BACKGROUND

Devices, such as backup devices, may be added to a computer network. Commands supported by a device may need to be adjusted in order to add the device to the computer network. Known techniques for adjusting the commands include utilizing a software patch generated for the device. As an example, a new device may be sent to a software engineer for testing. If the device does not operate properly, the software engineer may make a software patch that allows the device to operate properly. In some cases, the software patch may be posted to a website. These known techniques, however, involve manual intervention, and thus may not be sufficiently efficient in certain situations. It is generally desirable to be efficient in certain situations.

SUMMARY OF THE DISCLOSURE

In accordance with the present invention, disadvantages and problems associated with previous techniques for device support may be reduced or eliminated.

According to one embodiment of the present invention, adjusting one or more command parameters for a device of a computer network includes accessing command sets. A command set comprises one or more commands supported by a known device, and a command has one or more command parameters. One or more command sets associated with an unknown device are identified. The following are repeated for each command set of the one or more command sets until a termination event occurs: applying the command set to the unknown device to perform an operation; determining whether the command set has failed to perform the operation; and automatically adjusting the command parameters of the command set if the command set has failed to perform the operation.

Certain embodiments of the invention may provide one or more technical advantages. A technical advantage of one embodiment may be that command parameters for device support may be automatically adjusted. Automatically adjusting command parameters may allow for efficient addition of devices to a computer network.

Another technical advantage of one embodiment may be that command parameters of command sets are automatically adjusted until successful command sets are established. Another technical advantage of one embodiment may be that successful command sets may be organized and stored as device personalities. Another advantage of one embodiment may be that device personalities comprising successful command sets may be distributed to other devices.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of a computer network operable to automatically adjust command parameters to support devices; and FIG. 2 is a flowchart illustrating one embodiment of a method for automatically adjusting command parameters to support devices.

DETAILED DESCRIPTION OF THE DRAWINGS

Embodiments of the present invention and its advantages are best understood by referring to FIGS. 1 and 2 of the drawings, like numerals being used for like and corresponding parts of the various drawings.

FIG. 1 is a block diagram illustrating one embodiment of a computer network 10 operable to automatically adjust command parameters to support devices. According to the embodiment, computer network 10 may adjust command parameters until successful command parameters are established. Successful command parameters may be organized and stored as device personalities, which may be distributed to other devices.

According to one embodiment, computer network 10 includes components such as devices. In general, a device may include any suitable arrangement of components operable to perform the operations of the device. As an example, a device may include logic, an interface, memory, other component, or any suitable combination of the preceding. "Logic" may refer to hardware, software, other logic, or any suitable combination of the preceding that may be used to provide information or instructions. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both.

"Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to one embodiment, computer network 10 operates to communicate information among the devices of computer network 10 and of other networks. Information may refer to voice, data, text, audio, video, multimedia, control, signaling, other information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

According to the illustrated embodiment, computer network 10 includes an application server 12, a switch 14, a database 16, and a device 18 coupled as shown. Application server 12 may represent a device operable to launch software applications. Application server 12 may include any suitable software applications to perform the operations of computer network 10. According to one embodiment, application server 12 includes a command manager 20. Command manager 20 may automatically adjust command parameters for device 18. Switch 14 may represent a device operable to route packets to the appropriate destination.

Database 16 may represent a device operable to store and facilitate retrieval of information. According to the illustrated embodiment, database 16 stores command information 22. Command information 22 may include device personalities of devices 18. A device personality of a device 18 may refer to commands supported by device 18. A command may refer to an instruction for device 18. A command set may refer to a set of commands associated with a specific operation of device 18.

A command may have one or more command parameters. A command parameter may refer to a variable of a command that takes on particular values. A command parameter may be adjusted by changing the value of the command parameter. Command parameters may be designated as major or minor. A major command parameter may yield a greater change in the command than a minor command parameter.

According to one embodiment, command information 22 may include in/out (I/O) commands. An I/O command is used to send other commands to a device. An I/O command may be defined by specifying I/O parameters for the I/O command.

Command information 22 may be obtained in any suitable manner. In one embodiment, command information 22 may be received from the device manufacturer and entered into database 16 by device certification engineers. If the command set in command information 22 encounters command errors, command manager 20 may explore possible command personalities predefined in the generic entry of command information 22 until a working command personality is identified. Command manager 20 may then store the new command personalities in a new entry in command information 22 for subsequent queries.

In another embodiment, the command personality may be determined by trial and error. In this embodiment, no data entry is required by the device certification engineers. This embodiment may require additional time and processing, but may minimize or eliminate the need for data entry.

Device 18 may represent any suitable device that may be added to computer network 10. Device 18 may perform operations. A device 18 may have one or more device descriptors that describe device 18. Device descriptors may include device type, device operation, vendor, make and model, or any combination of any of the preceding. A device type may refer to a classification of a device 18 by, for example, the functionality of the device 18. Example device types include tape drives, hard drives, optical drives, robotic drives, CD/DVD drives, SCSI adapters, and/or Fiber Channel adapters.

A device operation may refer to an action or other suitable activity performed by device 18. For example, a device with a robotic arm may perform device operations that retract and extend the robotic arm. A vendor may refer to the manufacturer or vendor of device 18. A make and model may refer to the make and model of device 18.

According to one embodiment, command information 22 may be associated with devices 18. According to the embodiment, command information 22 such as device personalities or command sets may categorized according to device descriptors describing device 18. As an example, device personalities may be categorized by hardware vendor, device type, or both. As another example, command sets may be categorized by device operations, hardware vendor, or both.

In an embodiment of operation, command manager 20 detects device 18 and queries device 18 for an inquiry identifier. Device 18 responds with the inquiry identifier. If device 18 is supported, command manager 20 queries database 16 for a support entry associated with the inquiry identifier. The support entry may include the devices and SCSI personality. Database 16 returns the support entry that includes command sets.

If a command set has a command that fails, command manager 20 enters a self-adjusting mode. In this mode, command manager 20 retries the failed command with different possible combinations until a working combination is identified. The working combination is sent to database 16, which creates a new entry for device 18.

One or more components of computer network 10 may operate on one or more computers, and may be integrated or separated according to particular needs. If any components of computer network 10 are separated, the separated components may be coupled to each other using one or more storage area networks (SANS), local area networks (LANs), metropolitan area networks (MANs), wide area networks (WANs), global computer networks such as the Internet, or any other appropriate wire line, wireless, or other links.

Modifications, additions, or omissions may be made to computer network 10 without departing from the scope of the invention. The components of computer network 10 may be integrated or separated according to particular needs. Moreover, the operations of computer network 10 may be performed by more, fewer, or other modules. Additionally, operations of computer network 10 may be performed using any suitable logic. As used in this document, "each" refers to each member of a set or each member of a subset of a set.

FIG. 2 is a flowchart illustrating one embodiment of a method for automatically adjusting command parameters to support devices. The method may be performed by command manager 20 of computer network 10 of FIG. 1.

The method begins at step 110, where a device 18 added to computer network 10 is identified. Device 18 may be identified according to a device identifier of device 18.

A device personality associated with device 18 is selected at step 112. A device personality may be associated with device 18 according to any suitable selection rule. According to one embodiment, a selection rule may state that the device personality with device descriptors that most closely match those of device 18 is to be selected. The device descriptors may be placed in a sequence according to which the descriptors are searched. A match with a descriptor earlier in the sequence identifies the device personality, such that subsequent descriptors are not searched. An example, a sequence may include make and model, vendor, and device operation.

According to another embodiment, a selection rule may state that the device personality with the simplest commands is to be selected. The device personality with the simplest commands may be the device personality that requires the highest number of commands to perform an operation.

One or more command sets corresponding to the device personality are retrieved at step 114. The commands of a command set may serve as baseline commands that may be adjusted to generate commands for device 18. According to one embodiment, one command set may be retrieved and tested. According to another embodiment, more than command set may be retrieved, and a command set may be selected in accordance with the testing.

A command set is selected at step 116. If only one command set is to be tested, then that command set is selected. If more than one command set is to be tested, a command set of the multiple command sets is selected.

The selected command set is tested on device 18 at step 118. The command set may succeed or fail at step 122. A command set may succeed if it satisfies a success criterion. For example, a success criterion may require that a command set for an operation cause the device to perform the operation within a predetermined time threshold. A command set may fails if it fails to satisfy a success criterion.

If the command set fails at step 122, the method proceeds to step 126. Parameters of the commands of the command may be adjustable at step 126. According to one embodiment, the parameters may be adjustable if the parameters may take on different values that have not been tested. The parameters may not be adjustable if all the values for the parameters have been tested and have failed. According to the embodiment, if some or all parameters of an optional command fail, the command may be removed from the command set. If some or all parameters of a mandatory command fails, the device may be disqualified and the vendor of the device may be notified of the failure.

According to one embodiment, parameters may be adjustable if a termination event has not occurred. As an example, a termination event may occur when there are no more adjustable parameters. As another example, a termination event may occur when the method has proceeded through a predetermined number of iterations. As another example, a termination event may occur if the tested command set has successfully performed the operation.

If the parameters are adjustable at step 126, the method proceeds to step 130, where the parameters are adjusted. Parameters may be adjusted by changing the values of the parameters. According to one embodiment, minor command parameters may be adjusted during one iteration, and the major command parameters may be adjusted during a subsequent iteration. The method then proceeds to step 142. If the parameters are not adjustable at step 126, the method proceeds to step 142.

If the command set succeeds at step 122, the method proceeds to step 138, where the command set is kept. There may be a next command set at step 142. If only one command set is tested, then there are no more command sets to test. If more than one command set is tested, then there is another command set to test if that current command set is not the last command set. If there is a next command set at step 142, the method returns to step 116 to select the next command set. If there is no next command set at step 142, the method proceeds to step 146.

The command set is established at step 146. If only one command set is tested, then that command set is established if it succeeded. If more than one command set is tested, an optimal command set may be selected according to one or more evaluation metrics. According to one example evaluation metric, the command set that takes the least time to run on device 18 may be selected. According to another example evaluation metric, a command set with the least number of commands may be selected.

One or more command sets are recorded as a device personality at step 150. Any suitable command sets may be recorded. According to one embodiment, successful command sets may be recorded. According to another embodiment, optimal command sets may be recorded.

The device personalities may be used for any suitable purpose. As an example, device personalities may be exported and transferred to different devices or websites for downloading. As another example, device personalities may provide baseline command sets for future applications of the method.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that command parameters for device support may be automatically adjusted. Automatically adjusting command parameters may allow for efficient addition of devices to a computer network.

Another technical advantage of one embodiment may be that command parameters of command sets are automatically adjusted until successful command sets are established. Another technical advantage of one embodiment may be that successful command sets may be organized and stored as device personalities. Another advantage of one embodiment may be that device personalities comprising successful command sets may be distributed to other devices.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for adjusting one or more command parameters for a device, the method comprising:
    accessing, by a command processor of an application server, a plurality of command sets,
        each command set of the plurality of command sets comprising one or more commands supported by a known device,
        each command of the one or more commands being an instruction for the known device,
        the each command of the one or more commands having a plurality of command parameters,
        the application server configured to launch one or more software applications to perform one or more operations of a computer network,
        the known device being a device associated with a particular command personality stored in a database, and
        the particular command personality comprising a command set of the plurality of command sets that is supported by the known device;
    identifying one or more command sets to be associated with an unknown device,
        the unknown device being a device that is not associated with the particular command personality stored in the database,
        the one or more command sets being identified from the plurality of command sets in accordance with a selection rule,
        the selection rule indicating that the one or more command sets with the simplest commands among the plurality of command sets are to be selected, and
        the one or more command sets with the simplest commands corresponding to the one or more command sets among the plurality of command sets that utilize the greatest number of commands to perform a particular operation of the one or more operations;
    repeating the following for each command set of the one or more command sets to yield a plurality of successful command sets:
        repeating the following until a termination event occurs:
            applying the each command set to the unknown device to perform the particular operation of the one or more operations;

determining whether the each command set has failed to perform the particular operation of the one or more operations; and automatically adjusting the command parameters of the each command set to yield a next combination of command parameters in response to a previous combination of command parameters of the each command set failing to perform the particular operation of the one or more operations; and sending a successful command set recorded in a device personality to a website, the website configured to download the device personality to another device similar to the unknown device.

2. The method of claim 1, wherein the termination event occurs when at least one of the following occurs:
the each command set has successfully performed the particular operation of the one or more operations;
there are no adjustable parameters of the command parameter of the each command set; and
the method has proceeded through a predetermined number of iterations.

3. The method of claim 1, wherein identifying the one or more command sets associated with the unknown device further comprises:
establishing one or more device descriptors associated with the unknown device; and
identifying the one or more command sets with one or more device descriptors that match the one or more device descriptors of the unknown device.

4. The method of claim 1, further comprising:
evaluating the successful command sets in accordance with one or more evaluation metrics; and
determining an optimal command set of the successful command sets in accordance with the evaluation.

5. The method of claim 1, further comprising:
establishing one or more successful command sets from the one or more command sets, a successful command set succeeding in performing the operation; and
associating the one or more successful command sets with a device personality corresponding to the unknown device.

6. The method of claim 1, further comprising:
establishing one or more successful command sets from the one or more command sets, a successful command set succeeding in performing the operation;
associating the one or more successful command sets with a device personality corresponding to the unknown device; and
distributing the device personality and the associated one or more successful command sets.

7. A server for adjusting one or more command parameters for a device, the server comprising:
a memory configured to:
store a plurality of command sets, each command set of the plurality of command sets comprising one or more commands supported by a known device, each command of the one or more commands being an instruction for the known device, the each command of the one or more commands having a plurality of command parameters, the known device being a device associated with a particular command personality stored in a database, and the particular command personality comprising a command set of the plurality of command sets that is supported by the known device; and
a processor coupled to the memory and configured to:

launch one or more software applications to perform one or more operations of a computer network;
identify one or more command sets to be associated with an unknown device, the unknown device being a device that is not associated with the particular command personality stored in the database, the one or more command sets being identified from the plurality of command sets in accordance with a selection rule, the selection rule indicating that the one or more command sets with the simplest commands among the plurality of command sets are to be selected, and the one or more command sets with the simplest commands corresponding to the one or more command sets among the plurality of command sets that utilize the greatest number of commands to perform a particular operation of the one or more operations;
repeat the following for each command set of the one or more command sets to yield a plurality of successful command sets:
repeat the following until a termination event occurs:
apply the each command set to the unknown device to perform the particular operation of the one or more operations; determine whether the each command set has failed to perform the particular operation of the one or more operations; and automatically adjust the command parameters of the each command set to yield a next combination of command parameters in response to a previous combination of command parameters of the each command set failing to perform the particular operation of the one or more operations; and
send a successful command set recorded in a device personality to a website, the website configured to download the device personality to another device similar to the unknown device.

8. The server of claim 7, wherein the termination event occurs when at least one of the following occurs:
the each command set has successfully performed the particular operation of the one or more operations;
there are no adjustable parameters of the command parameter of the each command set; and
the method has proceeded through a predetermined number of iterations.

9. The server of claim 7, the processor being further configured to identify the one or more command sets associated with the unknown device by:
establishing one or more device descriptors associated with the unknown device; and
identifying the one or more command sets with one or more device descriptors that match the one or more device descriptors of the unknown device.

10. The server of claim 7, the processor being further configured to:
evaluate the successful command sets in accordance with one or more evaluation metrics; and
determine an optimal command set of the successful command sets in accordance with the evaluation.

11. The server of claim 7, the processor being further configured to:
establish one or more successful command sets from the one or more command sets, a successful command set succeeding in performing the operation; and
associate the one or more successful command sets with a device personality corresponding to the unknown device.

12. The server of claim 7, the processor being further configured to:

establish one or more successful command sets from the one or more command sets, a successful command set succeeding in performing the operation;

associate the one or more successful command sets with a device personality corresponding to the unknown device; and distribute the device personality and the associated one or more successful command sets.

13. A non-transitory data storage medium storing an executable program that instructs a processor to:

access, by a command processor of an application server, a plurality of command sets, each command set of the plurality of command sets comprising one or more commands supported by a known device, each command of the one or more commands being an instruction for the known device, the each command of the one or more commands having a plurality of command parameters, the application server configured to launch one or more software applications to perform one or more operations of a computer network, the known device being a device associated with a particular command personality stored in a database, and the particular command personality comprising a command set of the plurality of command sets that is supported by the known device;

identify one or more command sets to be associated with an unknown device, the unknown device being a device that is not associated with the particular command personality stored in the database, the one or more command sets being identified from the plurality of command sets in accordance with a selection rule, the selection rule indicating that the one or more command sets with the simplest commands among the plurality of command sets are to be selected, and the one or more command sets with the simplest commands corresponding to the one or more command sets among the plurality of command sets that utilize the greatest number of commands to perform a particular operation of the one or more operations;

repeat the following for each command set of the one or more command sets to yield a plurality of successful command sets:

repeat the following until a termination event occurs: apply the each command set to the unknown device to perform the particular operation of the one or more operations; determine whether the each command set has failed to perform the particular operation of the one or more operations; and automatically adjust the command parameters of the each command set to yield a next combination of command parameters in response to a previous combination of command parameters of the each command set failing to perform the particular operation of the one or more operations; and send a successful command set recorded in a device personality to a website, the website configured to download the device personality to another device similar to the unknown device.

14. The non-transitory data storage medium of claim 13, wherein the termination event occurs when at least one of the following occurs:

the each command set has successfully performed the particular operation of the one or more operations;

there are no adjustable parameters of the command parameter of the each command set; and the method has proceeded through a predetermined number of iterations.

15. The non-transitory data storage medium of claim 13 storing the executable program that further instructs the processor to identify the one or more command sets associated with the unknown device by:

establishing one or more device descriptors associated with the unknown device; and identifying the one or more command sets with one or more device descriptors that match the one or more device descriptors of the unknown device.

16. The non-transitory data storage medium of claim 13 storing the executable program that further instructs the processor to:

evaluate the successful command sets in accordance with one or more evaluation metrics; and determine an optimal command set of the successful command sets in accordance with the evaluation.

17. The non-transitory data storage medium of claim 13 storing the executable program that further instructs the processor to:

establish one or more successful command sets from the one or more command sets, a successful command set succeeding in performing the operation; and associate the one or more successful command sets with a device personality corresponding to the unknown device.

18. The non-transitory data storage medium of claim 13 storing the executable program that further instructs the processor to:

establish one or more successful command sets from the one or more command sets, a successful command set succeeding in performing the operation;

associate the one or more successful command sets with a device personality corresponding to the unknown device; and distribute the device personality and the associated one or more successful command sets.

19. A system for adjusting one or more command parameters for a device, the system comprising:

means for accessing, by a command processor of an application server, a plurality of command sets, each command set of the plurality of command sets comprising one or more commands supported by a known device, each command of the one or more commands being an instruction for the known device, the each command of the one or more commands having a plurality of command parameters, the application server configured to launch one or more software applications to perform one or more operations of a computer network, the known device being a device associated with a particular command personality stored in a database, and the particular command personality comprising a command set of the plurality of command sets that is supported by the known device;

a processor configured to identify one or more command sets to be associated with an unknown device, the unknown device being a device that is not associated with the particular command personality stored in the database, the one or more command sets being identified from the plurality of command sets in accordance with a selection rule, the selection rule indicating that the one or more command sets with the simplest commands among the plurality of command sets are to be selected, and the one or more command sets with the simplest commands corresponding to the one or more command sets among the plurality of command sets that utilize the greatest number of commands to perform a particular operation of the one or more operations;

a processor configured to repeat the following for each command set of the one or more command sets to yield a plurality of successful command sets:
  repeating the following until a termination event occurs:
    applying the each command set to the unknown device to perform the particular operation of the one or more operations; determining whether the each command set has failed to perform the particular operation of the one or more operations; and automatically adjusting the command parameters of the each command set to yield a next combination of command parameters in response to a previous combination of command parameters of the each command set failing to perform the particular operation of the one or more operations; and
  means for sending a successful command set recorded in a device personality to a website, the website configured to download the device personality to another device similar to the unknown device.

20. A method for adjusting one or more command parameters for a device of, the method comprising:
  accessing, by a command processor of an application server, a plurality of command sets,
    each command set of the plurality of command sets comprising one or more commands supported by a known device,
    each command of the one or more commands being an instruction for the known device,
    the each command of the one or more commands having a plurality of command parameters,
    the application server configured to launch one or more software applications to perform one or more operations of a computer network,
    the known device being a device associated with a particular command personality stored in a database, and
    the particular command personality comprising a command set of the plurality of command sets that is supported by the known device;
  identifying one or more command sets to be associated with an unknown device,
    the one or more command sets identified from the plurality of command sets,
    the unknown device being a device that is not associated with the particular command personality stored in the database, and
    identifying the one or more command sets associated with the unknown device further comprising:
      establishing one or more device descriptors associated with the unknown device;
      identifying the one or more command sets with one or more device descriptors that match the one or more device descriptors of the unknown device; and
      identifying the one or more command sets in accordance with a selection rule,
        the selection rule indicating that the one or more command sets with the simplest commands among the plurality of command sets are to be selected, and
        the one or more command sets with the simplest commands corresponding to the one or more command sets among the plurality of command sets that utilize the greatest number of commands to perform a particular operation of the one or more operations; and
  repeating the following for each command set of the one or more command sets:
    repeating the following until a termination event occurs:
      applying the each command set to the unknown device to perform the particular operation of the one or more operations;
      determining whether the each command set has failed to perform the particular operation of the one or more operations; and
      automatically adjusting the command parameters of the each command set to yield a next combination of command parameters in response to a previous combination of command parameters of the each command set failing to perform the particular operation of the one or more operations,
      the termination event occurring when at least one of the following occurs:
        the each command set has successfully performed the particular operation of the one or more operations;
        there are no adjustable parameters of the command parameter of the each command set; and
        the method has proceeded through a predetermined number of iterations; and
  establishing a plurality of successful command sets from the one or more command sets, a successful command set succeeding in performing the operation;
  evaluating the successful command sets in accordance with one or more evaluation metrics;
  determining an optimal command set of the successful command sets in accordance with the evaluation by selecting a successful command set with the least number of commands;
  associating the one or more successful command sets with a device personality corresponding to the unknown device; and
  distributing the device personality and the associated one or more successful command sets to a website, the website configured to download the device personality to another device similar to the unknown device.

* * * * *